US009608987B2

(12) United States Patent
Chen et al.

(10) Patent No.: US 9,608,987 B2
(45) Date of Patent: Mar. 28, 2017

(54) SYSTEMS AND METHODS FOR THE SECURE SHARING OF DATA

(71) Applicant: BroadVision, Inc., Redwood City, CA (US)

(72) Inventors: Pehong Chen, Atherton, CA (US); Tucker Henderson, Mountain View, CA (US); William Wu, Saratoga, CA (US); Peter Chu, Cupertino, CA (US)

(73) Assignee: BroadVision, Inc., Redwood City, CA (US)

( * ) Notice: Subject to any disclaimer, the term of this patent is extended or adjusted under 35 U.S.C. 154(b) by 17 days.

(21) Appl. No.: 14/614,262

(22) Filed: Feb. 4, 2015

(65) Prior Publication Data
US 2016/0226854 A1 Aug. 4, 2016

(51) Int. Cl.
*H04L 29/06* (2006.01)
*G06F 9/48* (2006.01)

(52) U.S. Cl.
CPC .......... *H04L 63/083* (2013.01); *G06F 9/4881* (2013.01); *H04L 63/10* (2013.01)

(58) Field of Classification Search
CPC ..... H04L 63/08; H04L 63/0869; H04L 63/10; H04L 63/101; H04L 63/12; H04L 63/123; H04L 63/083; G06F 21/31; G06F 9/4881
USPC ............ 726/2–8, 27–30; 713/150, 168–170; 709/225
See application file for complete search history.

(56) References Cited

U.S. PATENT DOCUMENTS

| | | | |
|---|---|---|---|
| 5,941,947 A | * | 8/1999 | Brown ................ G06F 21/6218 709/225 |
| 6,301,245 B1 | | 10/2001 | Luzeski et al. |
| 7,444,383 B2 | | 10/2008 | Horvitz |

(Continued)

FOREIGN PATENT DOCUMENTS

| DE | 10041271 | 3/2002 |
|---|---|---|
| EP | 1503318 | 2/2005 |

OTHER PUBLICATIONS

Asana.com; "World Wide Web site Asana.com," http://www.asana.com/; last visted on Apr. 24, 2013, in two pages.

(Continued)

*Primary Examiner* — Hosuk Song
(74) *Attorney, Agent, or Firm* — Knobbe, Martens, Olson & Bear LLP

(57) ABSTRACT

In various embodiments, a computer-implemented method for sharing tasks over one or more computer networks is disclosed. The method includes providing a task created on a first computer system located in a first network, the task comprising content information and metadata information. The task can be shared with a user of a second network that is different from the first network. The method can include transmitting the metadata information of the task to a second computer system in the second network over the one or more computer networks without transmitting the content information, the metadata information comprising at least a task identifier. The method can include receiving a request from the user to access the task. The method can include verifying that the user is a task participant. The content information of the task can be securely presented to the user over the one or more computer networks.

27 Claims, 10 Drawing Sheets

(56) References Cited

U.S. PATENT DOCUMENTS

| | | | |
|---|---|---|---|
| 7,624,125 | B2 | 11/2009 | Feinsmith |
| 7,836,510 | B1 * | 11/2010 | Angal ................. G06F 21/6218 705/51 |
| 8,027,861 | B2 | 9/2011 | Brintle |
| 8,594,292 | B1 * | 11/2013 | Moore .............. H04M 3/42042 379/201.01 |
| 8,639,552 | B1 | 1/2014 | Chen et al. |
| 9,152,707 | B2 * | 10/2015 | Libich ............... G06F 17/30817 |
| 2003/0135565 | A1 | 7/2003 | Estrada |
| 2008/0148189 | A1 | 6/2008 | Szent-Miklosy |
| 2010/0287023 | A1 | 11/2010 | Knobel et al. |
| 2011/0154338 | A1 | 6/2011 | Ramanathaiah et al. |
| 2011/0276396 | A1 | 11/2011 | Rathod |
| 2011/0276896 | A1 | 11/2011 | Zambetti et al. |
| 2011/0289149 | A1 | 11/2011 | Shmueli et al. |
| 2012/0236037 | A1 | 9/2012 | Lessing et al. |
| 2012/0278388 | A1 | 11/2012 | Kleinbart et al. |
| 2013/0097526 | A1 | 4/2013 | Stovicek et al. |

OTHER PUBLICATIONS

Do.com; "World Wide Web site Do.com," https://www.do.com/; last visited on Apr. 24, 2013, in three pages.

International Search Report and Written Opinion issued Jun. 16, 2014 for International Application No. PCT/US2014/012566 filed Jan. 22, 2014 in 12 pages.

Producteev.com; "World Wide Web site Producteev.com," http://www.producteev.com/; last visted on Apr. 24, 2013, in two pages.

* cited by examiner

EXAMPLE OF PUBLIC METADATA FOR A DOCUMENT OBJECT

| id | string ( object id ) | 855 |
|---|---|---|
| Time Created | unix timestamp | 123456789 |
| Time Updated | unix timestamp | 123456789 |
| Creator | string ( object id ) | 123456_1 |
| Editor | string ( object id ) | 123456_1 |
| Status | int | 1 |
| lifecycle_state | int | 0 |
| dominant_activity_time | unix timestamp | 123456789 |
| name | string | "Document_Name" |

*FIG. 4A*

EXAMPLE OF PUBLIC METADATA FOR A TASK OBJECT

| id | string ( object id ) | 985 |
|---|---|---|
| Time Created | unix timestamp | 123456789 |
| Time Updated | unix timestamp | 123456789 |
| Creator | string ( object id ) | 123456_1 |
| Editor | string ( object id ) | 123456_1 |
| Status | int | 1 |
| lifecycle_state | int | 0 |
| dominant_activity_time | unix timestamp | 123456789 |
| name | string | "Task_Name" |
| userSegments | UserSegmentsExportRecord | SEE UserSegmentsExportRecord |
| attachmentsKey[] | string [] ( object ids ) | [ 123456_1, 123457_1 ] |

*FIG. 4B*

| TASK IDENTIFIER ⌐217 | TASK CREATOR ⌐219 | TASK RECIPIENTS ⌐221 | TASK CONTENT ⌐223 | SERVER ADDRESS ⌐228 |
|---|---|---|---|---|
| SUBJECT LINE | "FROM" LINE | "TO" AND "CC" LINES | E-MAIL MESSAGE FIELD | "TO" OR "CC" FIELDS |
| EXAMPLE | | | | |
| CREATE WIDGET PROTOTYPE | USER 1 | TO: USER 2 CC: USER 3, | -SCHEDULE DESIGN MEETING -DIVIDE TASKS -CREATE DESIGN SCHEDULE | TASKS@SERVER.COM |

TASK CREATION PACKET - E-MAIL

SYSTEMS AND METHODS FOR THE SECURE SHARING OF DATA

BACKGROUND

Field of the Invention

The present invention relates to systems and methods for the secure sharing of data across one or more networks.

Description of the Related Art

Global communications networks have enabled users to collaborate on projects, whether the collaborating users are located near one another or are separated by thousands of miles. Users can collaborate over one or more networks using real-time communications tools (e.g., voice communications and online real-time messaging) or using time-delay communications tools (e.g., e-mail). When collaborating on projects, it can be important to ensure that private data relating to the user and/or project remains private.

Furthermore, in e-mail systems, it can be difficult to share content data and manage task assignments in real-time. For example, when one user updates a spreadsheet with new data, the other users cannot readily see the updates unless the user re-sends the spreadsheet to all the users. When multiple documents are being created and edited by multiple users, the back-and-forth nature of e-mail can create confusion, as users may be unsure which version of a document is the most updated or which assignments are being performed by which users. In addition, the back-and-forth nature of e-mail can create confusion as to whether and when assignments have been accomplished and may not adequately ensure that the task assignments are being completed according to the desired schedule. Accordingly, there remains a continuing need for the secure sharing of data across multiple networks.

SUMMARY

In one embodiment, a computer-implemented method for sharing tasks over one or more computer networks is disclosed. The method can include providing a task created on a first computer system located in a first node, the task comprising content information and metadata information. The task can be shared with a user of a second node that is different from the first node. The metadata information of the task can be transmitted to a second computer system in the second node over the one or more computer networks without transmitting the content information. The metadata information can comprise at least a task identifier. The method can comprise receiving a request from the user to access the task. The method can comprise verifying that the user is a task participant. The method can include securely presenting the content information of the task to the user over the one or more computer networks.

In another embodiment, a computer-implemented method for sharing computer objects over one or more computer networks is disclosed. The method can include providing a computer object on a first computer system located in a first node, the computer object comprising content information and metadata information. A sharing relationship can be created for the computer object with a user of a second node that is different from the first node. The metadata information of the computer object can be transmitted to a second computer system in the second node over the one or more computer networks without transmitting the content information. A request can be received from the user over the one or more computer networks to access the computer object. The method can include verifying that the user has permission to access the computer object. The method can include securely presenting the content information of the computer object to the user over the one or more computer networks.

In yet another embodiment, a system for sharing computer objects over one or more computer networks is disclosed. The system can comprise a processing module configured to provide a computer object on a first computer system located in a first node, the computer object comprising content information and metadata information. The processing module can be configured to create a sharing relationship for the computer object with a user of a second node that is different from the first node. The processing module can be configured to verify that the user has permission to access the computer object. The system can also include a communications module configured to transmit the metadata information of the computer object to a second computer system in the second node over the one or more computer networks without transmitting the content information. The communications module can be configured to receive a request from the user over the one or more computer networks to access the computer object. The communications module can be configured to securely present the content information of the computer object to the user over the one or more computer networks.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific embodiments of the invention will now be described with reference to the following drawings, which are provided by way of example, and not limitation.

FIG. 4A is a schematic diagram of a public metadata packet for a document object, according to various embodiments.

FIG. 4B is a schematic diagram of a public metadata packet for a task object, according to various embodiments.

FIG. 7C is a schematic block diagram of a task creation packet implemented in an electronic mail (e-mail) message, in accordance with one embodiment.

DETAILED DESCRIPTION

Figure 1:
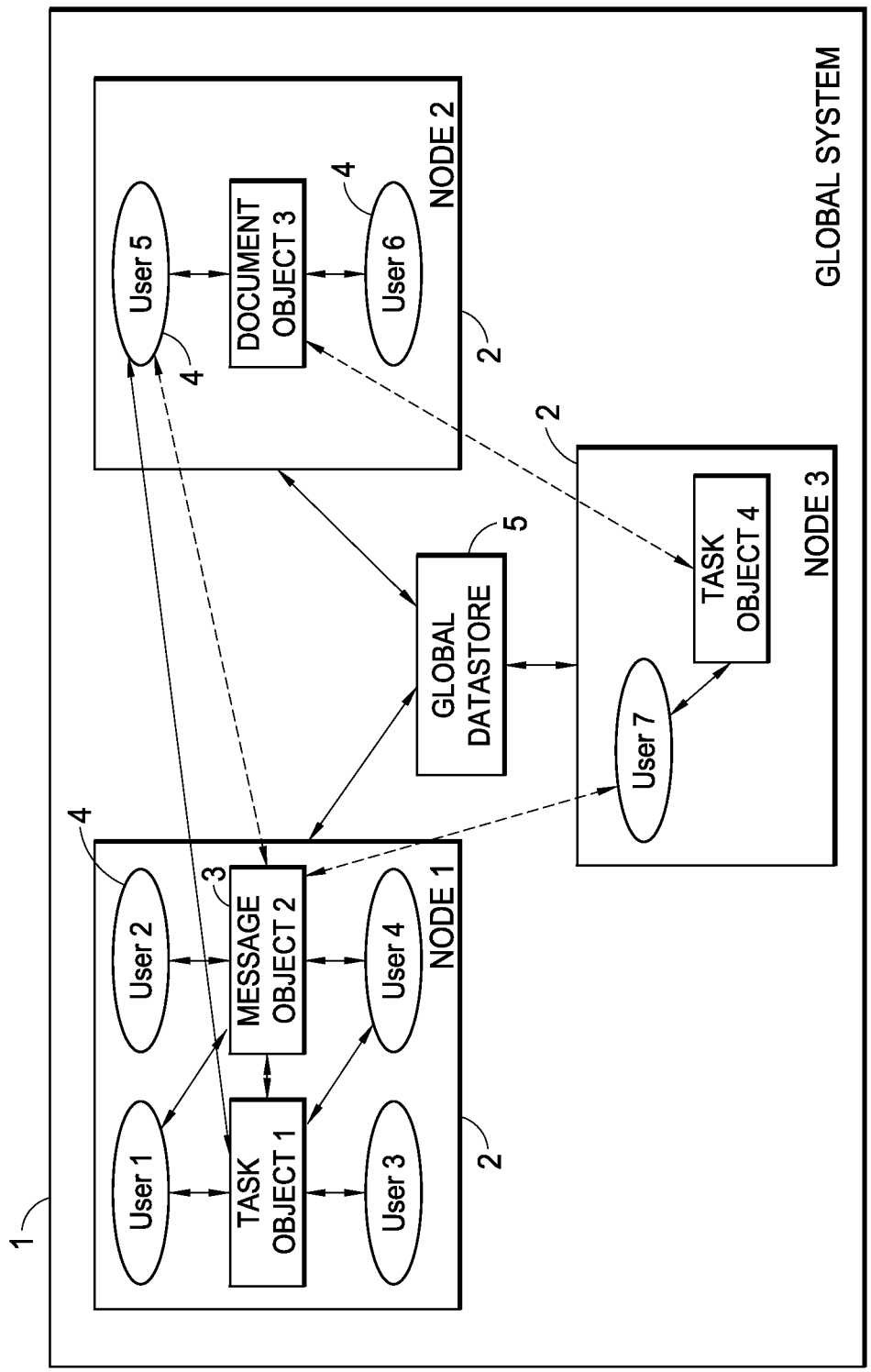
FIG. 1 is a schematic diagram of a system for sharing computer objects, according to one embodiment.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Various embodiments disclosed herein relate to systems and methods for securely sharing data across multiple nodes or installations. Users across the world can collaborate on projects and otherwise interact with one another over one or more computer networks. For example, in some embodiments, users can collaborate on a particular task that is managed by a computer system that is located within a particular node or installation (such as a node belonging to a particular company, organization, nation, etc.). During a particular collaboration, users may share various computer objects with one another by, e.g., reviewing or editing a document, updating a status of a task, adding messages to a blog or chat session, or any other suitable collaborative effort. It can be important to maintain a persistent copy of the object, e.g., a single copy that is collectively edited by each user, rather than managing multiple copies of the object made by each user. For example, in regular electronic mail (e-mail) messages, Bob may send out a document to Mary and Sue for review and editing. Mary may make one set of edits to the document, and Sue may make a different set of edits to the document. Further, when Sue sends her edits back to Bob and Mary, Bob and Mary may make further revisions. In conventional e-mail conversations, it can be time-consuming to integrate each user's revisions into a common document. Accordingly, there remains a continuing need for maintaining persistent objects that can be commonly edited by multiple users.

In some embodiments, for example, a single copy of the computer object (e.g., a task, a document, a message, a user object, etc.) may be stored on one computer system of a particular node or installation, and each user can edit that single copy. Utilizing a single copy of the object can enable persistence such that multiple revisions or other actions taken with respect to the object can be made in an efficient and collaborative manner. For example, if Mary and Bob are both editing a particular document, then Mary and Bob can each create a network connection with the persistent copy of the object and can edit the document accordingly. In some embodiments, Bob and Mary can sequentially make edits to the document, such that Bob can enter his edits to the persistent copy of the document and Mary can subsequently make her edits to the persistent copy. In other embodiments, Bob and Mary can concurrently make edits to the document, such that their revisions are reflected in the document object as they submit them.

As another example, Bob may assign a new task to Mary and Sue over the networks, for example, to create a budget for the next fiscal year. A single persistent copy of the task object can be stored on a particular computer system within a particular node or installation (e.g., within a particular country installation or business installation). Bob, Mary, and Sue can each access the single persistent copy of the task to, e.g., update the status of the task, communicate with one another about the task, upload new documents to the task dashboard, etc. In some embodiments, Bob, Mary, and Sue can sequentially access and/or modify the task object.

In addition, when sharing objects between multiple users, it can be important to ensure that sensitive or private data is kept secure without inhibiting the functionality of the overall system. For example, some entities (e.g., networks, organizations, countries, or other groups) may have rules or laws that require that certain types of data remains secure, e.g., that the data remains private and/or local to systems that are owned, controlled, and/or reside within or to the entity. As one example, some countries have passed, or are considering passing, laws that prohibit the storing of private data (e.g., residential address information, phone number, social security or other government identification number, financial and/or payment information, birthdate, and other types of private data) about a citizen on servers that are located outside those countries. It can be challenging to implement collaborative tools for citizens of countries having such requirements without storing private information about system users that may reside in these countries. For example, a task management system may use and/or store private information about users (including, but not limited to, the user's legal name, e-mail address, city of residence, birthdate, etc.), in addition to information that is non-private or public. In various embodiments, disclosed herein, the task management system can ensure that private information or data is kept secure (e.g., by ensuring that the private information is only stored on a machine within a node controlled by an authorized entity), while the task users can access and/or edit the non-private information.

As one example of the secure sharing of data, Bob may create a task and assign the task to Sue to be completed by a particular due date. Bob may be part of Entity A (e.g., Bob's underlying computer user object may be stored on a node in Entity A), and Sue may be part of Entity B (e.g., Sue's underlying computer user object may be stored on a node in Entity B). For purposes of this example, Entity A and Entity B are different countries, each with their own set of privacy laws. In other arrangements, Entity A and Entity B are different organizations or businesses, each with their own set of privacy policies. By way of example, Entity A (of which Bob is a member of citizen) may have a strict set of privacy laws that require private data regarding its citizens to be only stored locally on nodes or computer systems that are physically located within Entity A.

Bob can initially create the task, and the task data can be stored on a computer node (e.g., Node 1) within Entity A (e.g., Country A). The task data can include content information (which may include private or sensitive data subject to privacy laws or policies in Entity A) and metadata information (which identifies the task and various non-content properties of the task). When Bob assigns the task to Sue, an entry can be created in an object mapping table of a global datastore that associates a task identifier with Node 1. In addition, the public metadata regarding the task can be transmitted from Bob to Sue. The metadata can include information that is not private, e.g., identifying information related to the task and where the task data is stored. For example, the metadata can include the unique task identifier, the task creator, and other data that identifies the task. By contrast, the content information (which may include private or sensitive data) may not be transmitted to Sue, but rather may remain stored on Node 1 within or associated with Entity A. The content information can include the substantive information related to the task, such as the description of the task, the division of labor among task participants, task deadlines, documents or messages associated with the subject matter of the task, etc.

When Sue accepts the task, the system can utilize the public metadata to securely connect to the computer node on which the task content data is stored (e.g., Node 1). For example, Sue's computer system (Node 2, or in communication with Node 2) can parse the metadata to find the task identifier and can search the global object mapping table for the installation or node at which the content data for the task is stored, e.g., Node 1. A secure connection (which may be encrypted) can be established between Node 1 (Bob's system) and Node 2 (Sue's system), and Sue can securely access the content information for the task. In various embodiments, the content information is not transmitted from Node 1 to Node 2. In some embodiments, a copy is only temporarily transmitted to Node 2, or the content information is only viewable using a secure content reader or emulator. Because the private content information related to the task is stored locally on Node 1 without being transmitted freely to Node 2, the systems disclosed herein can advantageously be used to safeguard private data associated with the task and to comply with the privacy laws or policies of Entity A, while enabling collaboration over the task management system.

Various task management systems, such as the Vmoso systems developed by BroadVision, Inc., of Redwood City, Calif., may be used with some or all of the embodiments disclosed herein. Various details of the Vmoso systems have been described in U.S. Pat. No. 8,639,552, filed Feb. 4, 2013, and issued Jan. 28, 2014, which is hereby incorporated by reference herein in its entirety and for all purposes. In various embodiments, the embodiments described herein may be implemented over the Internet.

Definitions

As used herein, an input device can be, for example, a keyboard, rollerball, mouse, voice recognition system or other device capable of transmitting information from a user to a computer. The input device can also be a touch screen associated with the display, in which case the user responds to prompts on the display by touching the screen. The user may enter textual information through the input device such as the keyboard or the touch-screen.

Embodiments of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

As used herein, media refers to images, sounds, video or any other multimedia type data that is entered into the system.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

The system is comprised of various modules as discussed in detail below. As can be appreciated by one of ordinary skill in the art, each of the modules comprises various sub-routines, procedures, definitional statements and macros. In some embodiments, the software modules can be coded using PHP. In other embodiments, each of the modules can be separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®.

The system may be written in any conventional programming language such as PHP, C, C++, BASIC, Pascal, Perl, or Java, and run under a conventional operating system.

A web browser comprising a web browser user interface may be used to display information (such as textual and graphical information) to a user. The web browser may comprise any type of visual display capable of displaying information received via a network. Examples of web browsers include Microsoft's Internet Explorer browser, Apple's Safari Browser, Mozilla's Firefox browser, Google's Chrome browser or any other browsing or other application software capable of communicating with a network. Further, information may also be configured for and displayed in other suitable applications, such as applications programmed for implementation in mobile devices, such as mobile phones or other mobile computing devices.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Overview of System

FIG. 1 is a schematic diagram of a system 1 for sharing computer objects over one or more computer networks. As used herein, a computer object can comprise any suitable object that can be processed and stored on a computer, such as a task, a document, a message, a blog, a user or user group, etc. The global system 1 shown in FIG. 1 can comprise one or more nodes 2 in network communication with one another and/or with a global datastore 5. Each of the nodes 2 can include any type of computer system, such as one or more servers or computers configured to store, process, transmit, and receive data over communications networks. One or more computer objects can be stored on and/or associated with each node 2. For example, Task Object 1 and Message Object 2 can be stored on a computer system within Node 1. A plurality of users 4 can be members of the system 1 and can communicate with one another various communications protocols that interconnect the nodes 2. A user 4 can use her own local client computing device (such as a laptop computer, mobile device, mobile smartphone, tablet computer, etc.) to communicate with a node 2.

Each user 4 can be associated with a user computer object that is stored on a particular node 2. For example, the underlying user computer objects can include information about the user, such as the user's name and/or screenname, location, address, e-mail address, photograph, permissions, list of user groups, and/or any other information related to the user. As shown in FIG. 1, as one example, User 1, User 2, User 3, and User 4 may be associated with user computer objects that are stored on Node 1. User 5 and User 6 may be associated with user computer objects that are stored on Node 2, while User 7 may be associated with a user computer object that is stored on Node 3. Each node 2 can provide network or data communication between and among multiple computer systems. As explained herein, the computer systems within the node 2 can comprise one or more processors in electrical communication with various storage devices (which can comprise non-transitory computer readable storage media).

Objects (such as tasks, messages, users, documents) can be associated with one another within a particular node 2 and/or across multiple nodes 2. For example, as shown in FIG. 1, Users 1, 3, 4, and 5 can collaborate with one another on Task Object 1, which is stored in Node 1. Moreover, as indicated by the arrow between Task Object 1 and Message Object 2, Task Object 1 and Message Object 2 can also be associated or linked with one another within Node 1 (for example, if Message Object 2 is a message related to the subject matter of Task Object 1).

Users 1, 2, 4, 5, and 7 can collaborate with one another on Message Object 2, which is stored on Node 1. Users 5 and 6 can collaborate with each other on Document Object 3, which is stored on Node 2. User 7 can participate in Task Object 4 to conduct various projects. As shown by the dashed line in FIG. 1, Task Object 4 may be related to Document Object 3 (for example, Document Object 3 may be a spreadsheet or other document that relates to Task Object 4). In addition, each node 2 can communicate with the global datastore 5. As explained herein, the global datastore 5 can store data that can be used by all nodes 2 of the system 1, which, as explained herein, can enable the sharing of secure data between users 4.

In some arrangements, each node 2 may be associated with or be a part of a particular entity, such as a country, organization, business, etc. As one example, Node 1 may be associated with Country 1. Node 2 may be associated with Country 2, while Node 3 may be associated with Business 1. For example, with respect to Node 1, Task Object 1, Message Object 2, and the underlying user objects associated with Users 1-4 may be stored on servers or computer systems that are physically located in Country 1. In some embodiments, Users 1-4 may also be physically located in (or may be citizens or residents of) Country 1. With respect to Node 2, Document Object 3 and the underlying user objects associated with Users 5-6 may be stored on servers or computer systems that are physically located in Country 2. In some embodiments, Users 5-6 may also be physically located in (or may be citizens or residents of) Country 2. With respect to Node 3, Task Object 4 and the underlying user object for User 7 may be stored on a computer system that is owned by Business 1. In some embodiments, User 7 may be associated with Business 1 (e.g., as an owner, employee, customer, partner, etc.).

Each entity (e.g., Country 1, Country 2, Business 1, etc.) may have various policies, rules, regulations, or laws that govern the use of data over the nodes 2 associated with the particular entity. For example, Country 1 may have strict privacy laws that restrict the ability of computer systems within Node 1 (associated with Country 1) to transmit private data regarding the citizens or residents of Country 1 to computer systems that are physically located outside Country 1. For collaborative computer systems (such as computerized task management systems), such laws may make it difficult to enable effective collaboration while complying with privacy laws. Accordingly, various embodiments disclosed herein can advantageously provide for secure sharing of data across nodes 2 that enables collaboration while complying with privacy laws.

Figure 2:
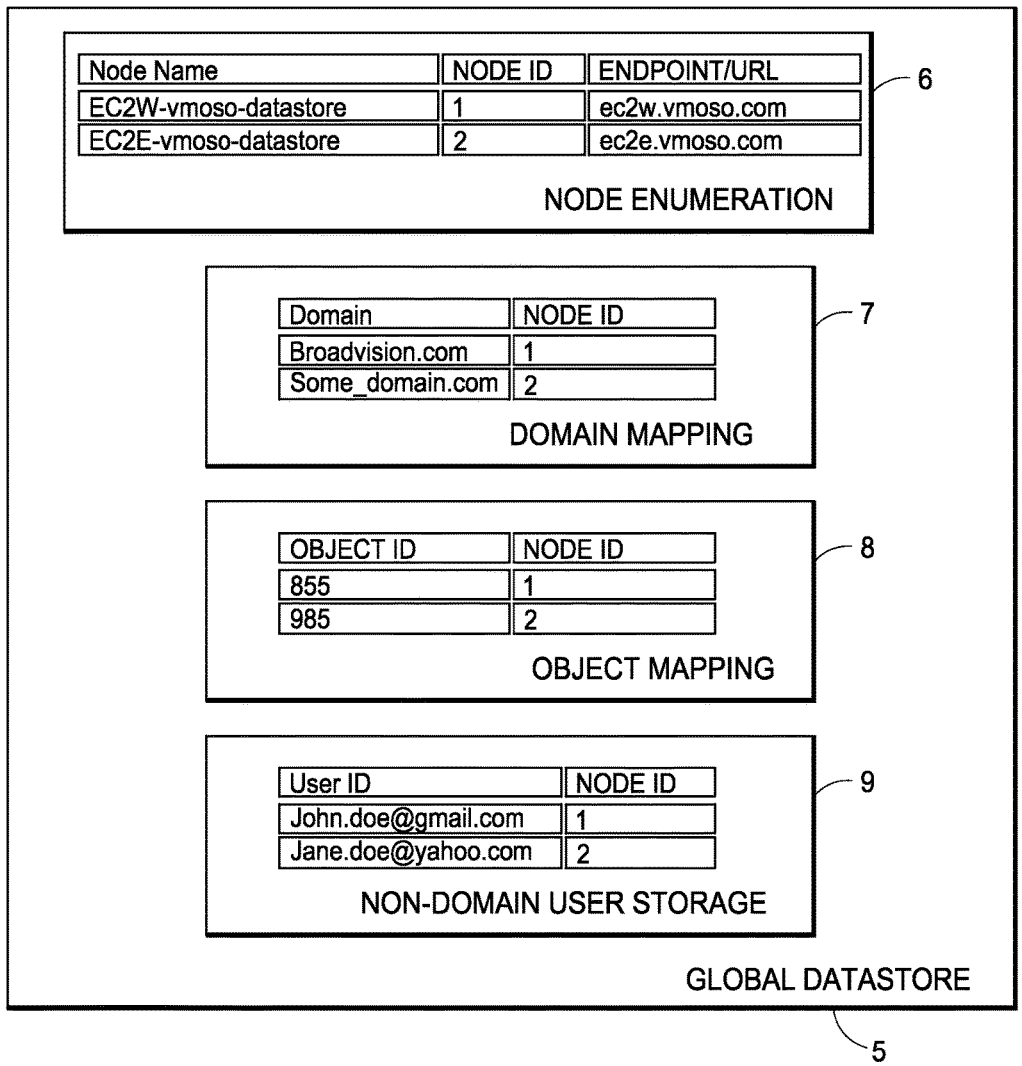
FIG. 2 is a schematic diagram of the global datastore illustrated in FIG. 1.

FIG. 2 is a schematic diagram of the global datastore 5 illustrated in FIG. 1. The global datastore 5 can comprise one or more storage modules configured to store data to be used or accessed by computers or servers across the system 1. As shown in FIG. 2, the global datastore 5 can include a node enumeration table 6, a domain mapping table 7, an object mapping table 8, and a non-domain user storage module 9. The global datastore 5 can present non-private data to the servers in the system 1 for identifying and locating other nodes 2, mapping the nodes 2 to which various domains are assigned, mapping the nodes 2 at which various objects are stored, and mapping the nodes 2 at which non-domain user information is stored. The system 1 can utilize the global datastore 5 for enabling the sharing of data while ensuring that private data remains secure.

The node enumeration table 6 shown in FIG. 2 can store a list of the nodes 2 of the system 1. As shown in FIG. 2, the node enumeration table 6 can store the name of the node 2, the node ID, and the endpoint or universal resource locator (URL) used to access the node 2. For example, the node 2 named "EC2W-vmoso-datastore" can be assigned as Node 1 and can be located on the system 1 by navigating a web browser or other networking tool to ec2w.vmoso.com. Similarly, the node 2 named "EC2E-vmoso-datastore" can be assigned an ID as Node 2 and can be located at ec2e.vmoso.com. Thus, for a particular node ID or node name, the system 1 can navigate to the desired node 2 for accessing and/or editing content stored at that node 2. The list of nodes 2 can be updated as nodes 2 are added to or removed from the system.

The domain mapping table 7 can associate a particular domain (e.g., a particular internet hosting location) with the node 2 at which information associated with the domain is stored. For example, the system 1 can include users 4 associated with various domains. In some arrangements, a particular user 4 can be associated with a company or organization that is a member or otherwise associated with the system 1. Each company can have company-specific data (including documents, user e-mail addresses, etc.) that are stored on the system 1. The system 1 can store data associated with a particular company or organization on an associated node 2 (or nodes). The domain mapping table 7 can map the data associated with a particular internet domain (e.g., a particular company, organization, etc.) with a node 2 of the system 1. For example, as shown in FIG. 2, users 4 from BroadVision, Inc., may be associated with broadvision.com, and data related to that domain may be stored at Node 1. Advantageously, the information stored in the domain mapping table 7 may not include any private information related to the individual users 4. Rather, only the domain associated with the organization or e-mail address is stored so that the location of the node 2 can be identified within the system 1. To access the private information relating to a user 4, a particular node 2 or user 4 can provide an access token that verifies that the particular node 2 or user 4 has access to the private information before the system 1 grants access to the private information. Thus, if a particular domain is identified (or if a particular user is identified as being associated with a particular domain), then the system 1 can identify the node(s) 2 at which data regarding that domain (e.g., company, organization, etc.) is stored. A user 4 or node 2 can present an access token to access underlying private data associated with the users stored in the table 7.

The object mapping table 8 can associate a particular object with the node 2 at which the object and its content are stored. For example, as explained herein, a computer object can comprise any suitable computer-implemented object, such as a computerized task, a document, a computer message, a blog, a user or user group, etc. Each object can be assigned a unique identifier, or object ID. The object mapping table 8 can identify the node 2 at which a particular object is stored. As explained herein, in various embodiments, it can be important to ensure that the object is stored only at a particular node 2 in order to comply with various restrictions imposed by outside entities (e.g., privacy laws). Thus, if an object ID is provided, the system 1 can identify the node ID of the node 2 at which the object is stored. For example, the system 1 can identify the node ID of the node 2 at which the object's content information and/or metadata information is stored. In some embodiments, fewer than all objects of the system 1 are stored in the object mapping table 8. Locations of some unlisted objects may be found based on the various sharing algorithms set forth herein.

The non-domain user storage table 9 can store information relating to users 4 that are not associated with a particular domain (e.g., a particular company, organization, etc.). For example, some users 4 may join the system 1 without being associated with a larger organization, and the non-domain user storage table 9 can associate identifying information (e.g., e-mail addresses) of the users 4 with the node 2 at which the information is stored. As shown in FIG. 2, for example, information about John Doe, having e-mail address John.doe@gmail.com, may be found at Node 1, and information about Jane Doe, having e-mail address Jane.doe@yahoo.com, may be found at Node 2. In various embodiments, only public information relating to the users 4 is stored in the non-domain user storage table 9.

Figure 3:
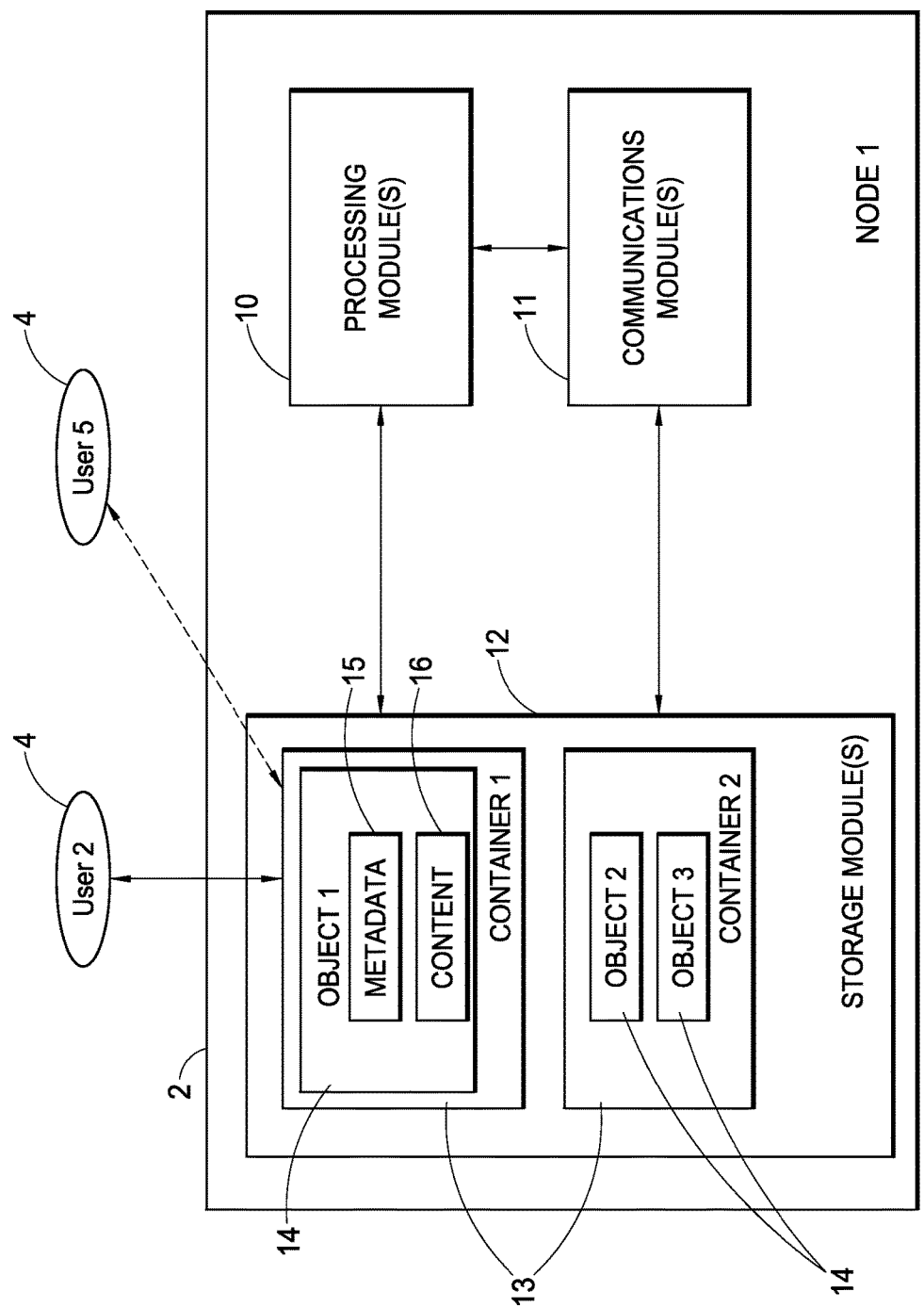
FIG. 3 is a schematic diagram of an example of a node, in accordance with various embodiments.

FIG. 3 is a schematic diagram of an example of a node 2, in accordance with various embodiments. The node 2 shown in FIG. 3 corresponds to Node 1 illustrated in FIG. 1. As shown in FIG. 3, the node 2 can include one or more processing modules 10, one or more communications modules 11, and one or more storage modules 12. The processing modules 10, communications modules 11, and/or storage modules 12 can be distributed across numerous computer systems and servers, in various embodiments. The processing modules 10 can include one or more processors configured or programmed to run any suitable processes, including, e.g., processes to be run by a task management system. For example, the processing module 10 can implement task management methods encoded onto software stored in the storage module 12. In some embodiments, for example, the processing module 10 can organize computerized tasks, manage the status of tasks, receive and transmit updates to tasks, modify tasks (e.g., in response to user updates or edits), and/or display task information to a user 4. The processing module 10 can also be configured to control the operation of the node 2.

The communications module 11 can be configured to manage network communications between users 4 and Node 1, and/or between Node 1 and the other nodes 2 of the system 1. For example, the communications module 11 can process various permissions, e.g., access tokens, which provide access to the node 2 to a user 4.

The storage module 12 can comprise a non-transitory, computer-readable storage medium for storing any suitable data. For example, the storage module 12 can store software instructions to be executed by the processor module 10 in various arrangements. In addition, the storage module 12 can store multiple objects 14, which can be organized into corresponding containers 13. The containers 13 can comprise separate compartments or folders and can be configured to sort the objects 14 according to various parameters. For example, containers 13 can be configured to sort objects 14 by project (e.g., a collection of related tasks), topic, user group (e.g., according to a particular community), level of access authority, etc. In some arrangements, the container 13 can be used to compartmentalize a particular object 14 or group of objects 14 and to associate the object(s) 14 with a particular group of authorized users.

By way of example, Object 1 shown in FIG. 3 can comprise a task to be shared between User 2 of Node 1 and User 5 of Node 2, such as Task Object 1 shown in FIG. 1. Object 1 can comprise metadata information 15 that identifies the task (e.g., task identifier, node ID at which task is stored, etc.) and content information 16 that includes the subject matter of the task (e.g., task description, task assignments, task status and deadlines, etc.). In some embodiments, User 2 (a member of Node 1) can create Object 1 (e.g., a task). The task associated with Object 1 can be stored in the storage module 12 of a computer system within Node 1. As explained above with respect to FIG. 1, Node 1 can be associated with a particular entity, e.g., Country 1, which has strict privacy laws. For example, the laws or regulations of Country 1 may require private data about its citizens or residents (e.g., User 2) to remain stored on a node 2 within Country 1. Thus, in various embodiments disclosed herein, private data (e.g., content information 16) can remain on Node 1 within Country 1, while other non-private data (e.g., metadata information 15) may be shared with users 4 outside Country 1 to establish effective collaboration among the users 4.

User 2 of Node 1 (and Country 1) can share the task of Object 1 with User 5 of Node 2 (outside Country 1). For example, User 2 can send a request to initiate a sharing relationship that associates User 5 with the task of Object 1. Object 1 can be stored in Container 1 of the storage module 12, and suitable access controls and permissions can be provided. For example, Container 1 can sort the metadata information 15 and the content information 16, and can identify the users 4 that have permission to access, read, and/or write to the task of Object 1. For example, when User 2 shares the task of Object 1 with User 5, the Container 1 can create an access token or other unique identifier that recognizes that User 5 has various levels of access (e.g. read access, write access, or both) to Object 1. Furthermore, when User 2 shares the task of Object 1 with User 5, a new entry can be created in the object mapping table 8 of the global datastore 5. For example, once Object 1 has been shared, the Object ID of Object 1 can be listed in the object mapping table 8. The node ID of the node 2 at which the data relating to Object 1 (e.g., Node 1) is stored can also be stored in the object mapping table 8. Thus, if User 5 (or the computer system to which User 5 is connected) is supplied with the Object ID of Object 1, the system 1 can identify the node 2 at which data relating to Object 1 is located.

Thus, if User 2 of Node 1 shares Object 1 with User 5 of Node 2, the system 1 can create a new entry in the object mapping table 8 that associates the Object ID of Object 1 with the Node ID of the node 2 at which Object 1 is stored (e.g., Node 1). Object 1 can be stored in Container 1 of the storage module 12 of Node 1, and Container 1 can be configured to recognize whether or not a user 4 has authorization to access (e.g., read, write, or both) Object 1.

In addition, when User 2 shares Object 1 with User 5, the system 1 can transmit the non-private metadata information 15 related to Object 1 to User 5. For example, the information 15 can be transmitted to Node 2, the node at which the underlying user object for User 5 is stored, but may not transmit the content information 16 of Object 1 to User 5. Transmitting the metadata information 15 to User 5 (e.g., at Node 2) can enable the User 5 to access the task without compromising the security of private data associated with the content information 16. Thus, while the content information 16 is not transmitted to User 5 at Node 2, the system 1 can transmit various types of non-private metadata information 15 to User 5 at Node 2.

FIG. 4A is a schematic diagram of a public (or non-private) metadata packet 20 for a document object. FIG. 4B is a schematic diagram of a public (or non-private) metadata packet 30 for a task object. Although FIGS. 4A-4B illustrate examples of document and task objects, it should be appreciated that other suitable computer objects may be used with the embodiments disclosed herein, including, e.g., message objects, blog objects, user or user group objects, etc. The packets 20, 30 represent non-private data that can be transmitted from User 2 (in Country 1) to User 5 (outside Country 1) without running afoul of Country 1's strict privacy laws. For example, with respect to the document object packet 20, the document object ID, time created, time updated, document creator, document editor, document status, document lifecycle state, dominant activity time, and name can be transmitted as non-private metadata information 15. With respect to the task object packet 30, the task ID, time created, time updated, task creator, task editor, task status, task lifecycle state, dominant activity time, name, list of users, and list of attachments can be transmitted as non-private metadata information 15.

User 5 can utilize the non-private metadata information 15 transmitted from User 2 to access the content information 16 of Object 1. For example, User 5 (or the node 2 associated with User 5, which is Node 2 in this example) can utilize the object ID provided in the metadata information 15 of the packet 20 or 30 to access the substantive content information 16 that is stored locally on Node 1. For example, based on the metadata information 15, User 5 can initiate a secure connection with Node 1, the node 2 at which the content information 16 of Object 1 is stored. In some arrangements, User 5 (by way of Node 2) can initiate a secure sockets layer (SSL), transport layer security (TSL), or other suitable encrypted connection with Node 1 to access Object 1. In some embodiments, User 5 can directly connect to Node 1, while in other embodiments, User 5 can connect to Node 1 by way of a proxy computer which can index the nodes 2 of the system 1. Over the secure connection, User 5 can access the content information 16 associated with the task of Object 1, and can read and/or write to Object 1. In some embodiments, the content information 16 may not be transmitted at all to User 5. In some embodiments, a temporary copy of the content information 16 may be transmitted to User 5 for temporary read and/or write access. In some embodiments, a specialized reader or emulator can be provided to present the content information 16 of Object 1 to User 5 without providing User 5 with a copy of the content information 16.

Regardless of whether or not a copy of the content information 16 is temporarily stored at Node 2 (associated with User 5), however, Container 1 of the storage module 12 of Node 1 can authorize User 5 to have access to the content information 16 of Object 1. In various embodiments, therefore, the authorization provided by Container 1 can enable sufficient access to User 5 so as to facilitate effective collaboration with User 2 while complying with the privacy laws of Country 1.

User 5 can request access to Object 1 (e.g., by way of a secure connection such as SSL or TSL). In various embodiments, User 5 can read and write to Object 1 to thereby modify Object 1. For example, User 5 can modify a document object associated with the task of Object 1, or can update the status of the task associated with Object 1. Object 1 can remain stored on Node 1, providing a persistent copy of the object. In some embodiments, multiple users 4 can simultaneously read and/or write to Object 1. In other embodiments, multiple users 4 can sequentially read and/or write to Object 1, such that one user has to finish edits before another user can begin their review and revisions.

Figure 5:
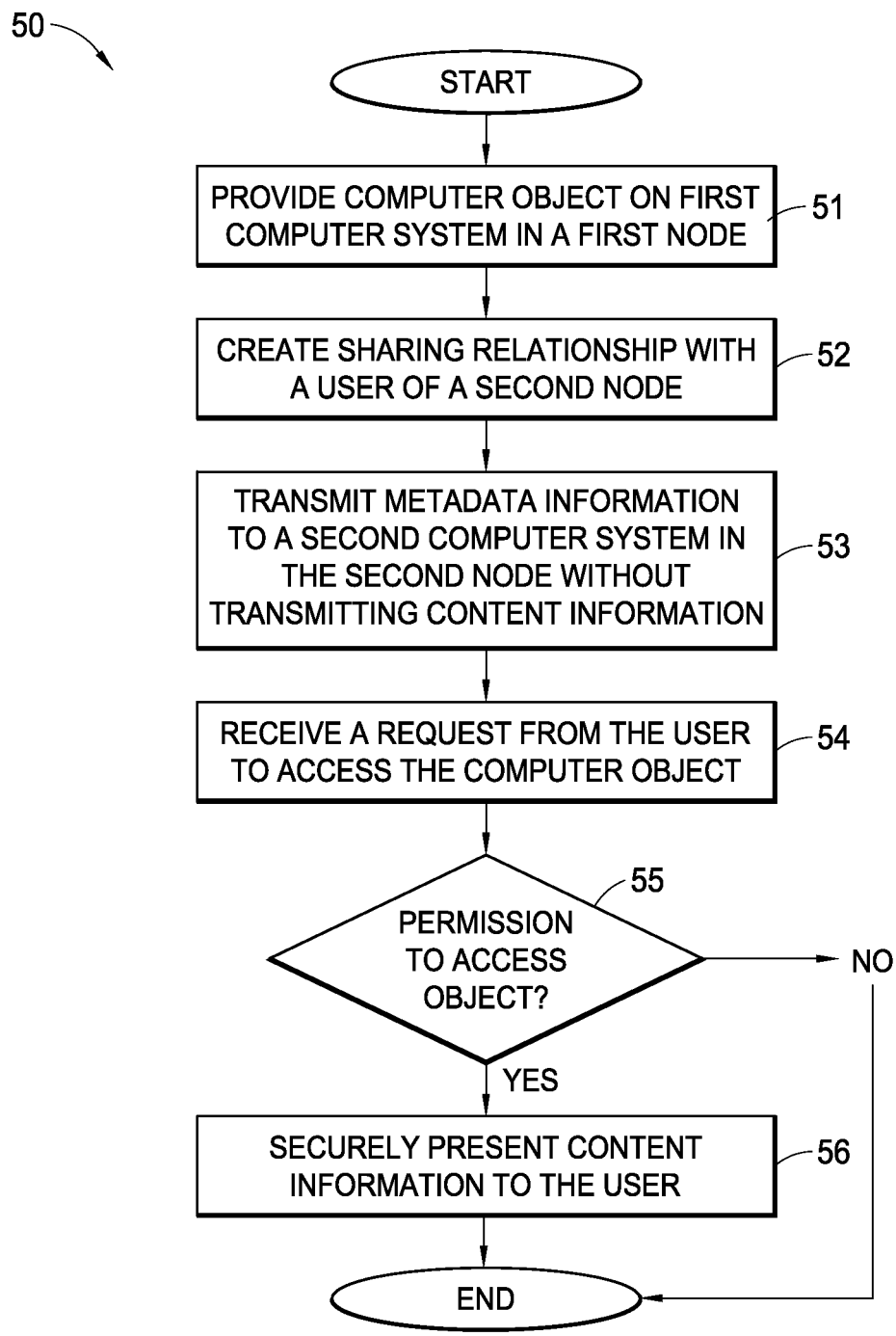
FIG. 5 is a flowchart illustrating a computer-implemented method for sharing computer objects, according to various embodiments.

FIG. 5 is a flowchart illustrating a computer-implemented method 50 for sharing computer objects 14 over one or more computer networks. In a block 51, a computer object can be provided on a first computer system in a first node. The computer object can be any suitable object, such as a task object, a file object, a document object, a message object, an internet post object, a user, a user group, etc. In various arrangements, a user can create the object and can store the object on the first computer system. The object can therefore be persistently associated with or stored on the first node. As explained herein, metadata information relating to the object may be shared with other users, while content information relating to the subject matter of the object may be retained as private or secure information.

Turning to a block 52, a sharing relationship can be created with a user of a second node that is different from the first node. For example, the object creator can share the created object with the user by sending an e-mail or otherwise initiating the sharing relationship. When the sharing relationship is initiated, the container to which the object is assigned or stored can sort access information that can authorize the user to have access to the object. In addition, an entry can be created in the global datastore in which the newly created sharing relationship is recorded. For example, the global datastore can associate the object ID with the node ID of the node at which the object is stored.

In a block 53, the metadata information associated with the object can be transmitted to a second computer system in the second node without transmitting content information. For example, as explained herein with respect to FIGS. 4A-4B, identifying information relating to the object can be transmitted to the user that is assigned or sharing the object. The system can sort the metadata information to associate the object ID of the object with the node ID of the node at which the object's content information is stored.

Moving to a block 54, the user can request access to the computer object. For example, the user can send an Internet or e-mail message to the system 1 (e.g., the node at which the content information is stored) that requests access (e.g., read and/or write access) to the object. In a block 55, a decision is made as to whether the user has permission to access the object. For example, as explained herein, the container to which the object is assigned or stored can include access or permissions information that associates the object with a list of one or more users that have various degrees of access (e.g., read access, write access, read and write access, no access, etc.) to the object. If the decision is that the user does not have permission to access the object, then the method 50 ends.

If the decision is made that the user has permission to access the object, then the content information can be securely presented to the user. For example, in various embodiments, a copy of the content information may not be transmitted from the object creator to the user. Instead, a specialized interface or emulator may be used to present the data to the user. In some embodiments, a copy is temporarily made available to the user after access has been granted.

Figure 6:
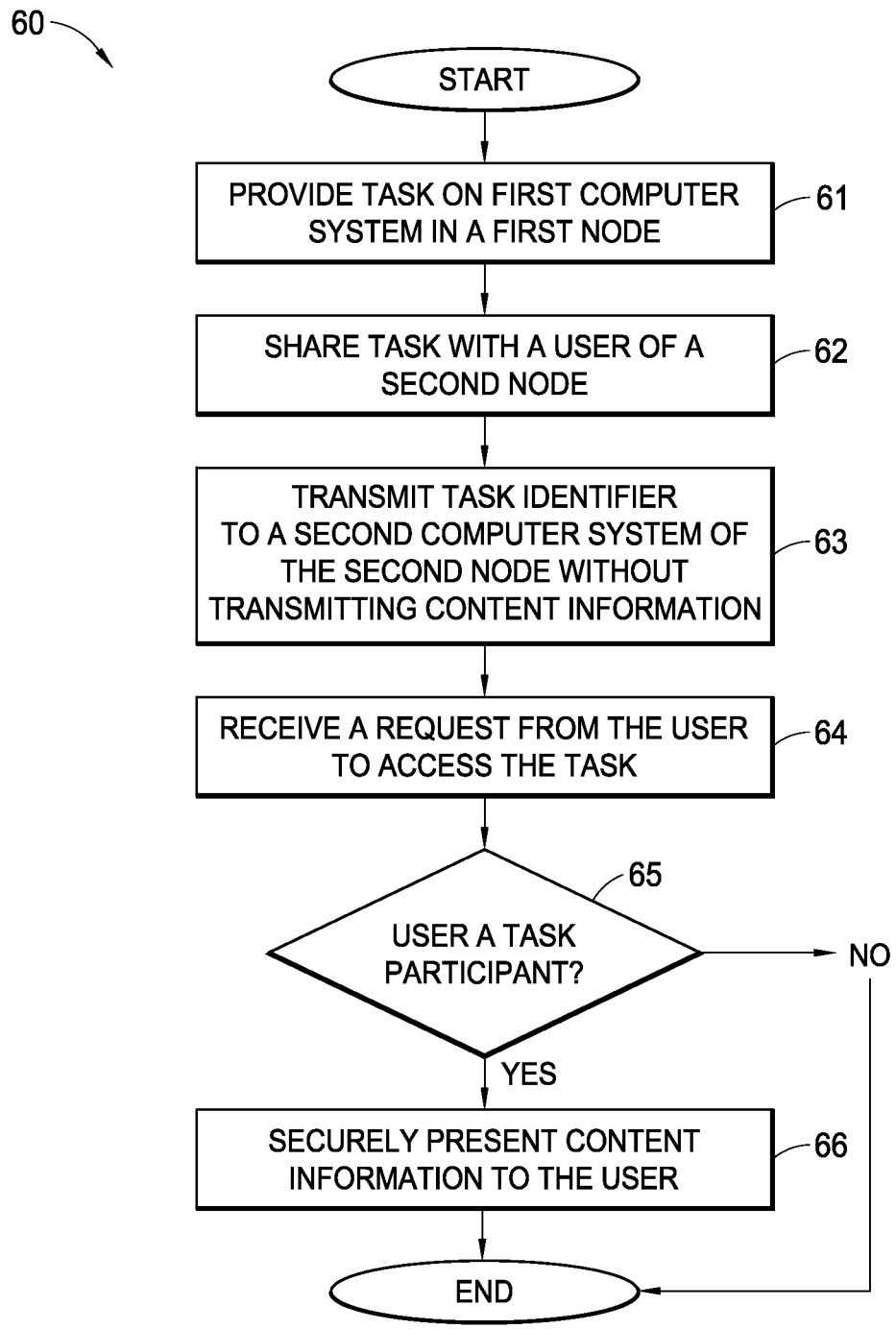
FIG. 6 is a flowchart of a computer-implemented method for sharing tasks, according to various embodiments.

FIG. 6 is a flowchart of a computer-implemented method 60 for sharing tasks over one or more computer networks. The method 60 begins in a block 61 to provide a task on a first computer system in a first node. The task can comprise metadata information and content information. For example, as explained herein, Bob of Node 1 can create the task and can store the task on a first computer system of the first computer node. For example, the task can be shared in Container 1 of Node 1. The metadata information may be shared with users outside the first network, but the content information may be kept secure and localized within the first node (e.g., made private to the Node 1).

Turning to a block 62, the task can be shared with a user of a second node. As an example, Bob can share the task with Sue of Node 2. When Bob shares the task with Sue, Container 1 of Node 1 can create access tokens that provide Sue with access (e.g., read access, write access, or both) to the task. In addition, an entry is created in the global datastore which associates the task with the node at which the task is stored (e.g., Node 1).

The method 60 moves to a block 63, in which a task identifier is transmitted to a second node without transmitting content information. As explained herein, when the task is shared, Bob can send Sue at Node 2 the metadata information associated with the task, which can comprise a unique task identifier. Sue's system can look up the node at which the associated task is stored (Node 1).

In a block 64, a request from the user can be received to access the task. For example, after being shared the task, Sue can request access (e.g., read access, write access, or both) to the task by sending a message to Node 1. In a decision block 65, it can be determined whether the user (Sue) is a task participant. If the decision is no, then the method 60 ends. If, a decision is made that Sue is a task participant (and therefore has access to the task), then the method 60 moves to a block 66, in which the content information of the task is presented to the user (Sue). For example, in some embodiments, the description and objectives of the task, the task deadlines, the task assignments, the task status, and other task action items can be presented or displayed to the user.

Task Management System Overview

Figure 7A:
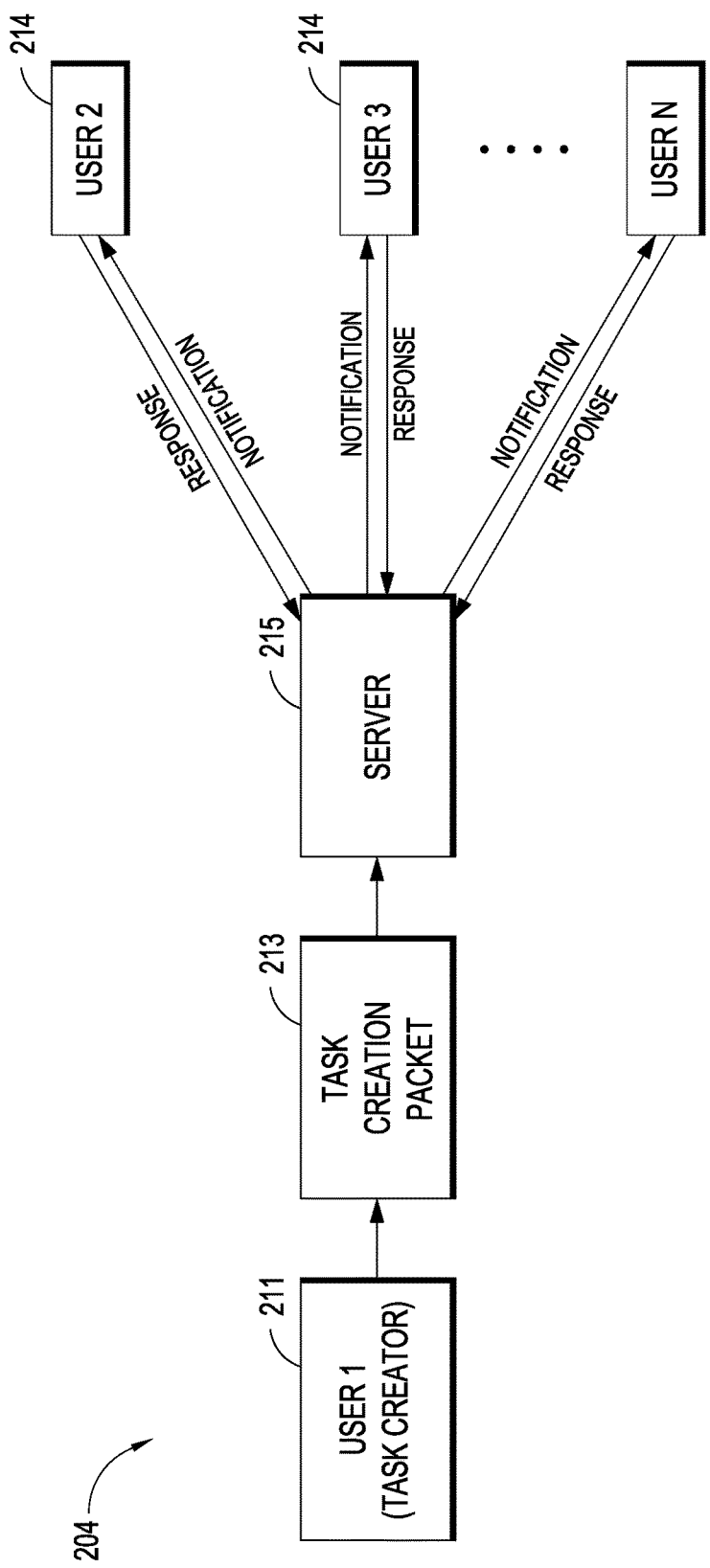
FIG. 7A is a schematic block diagram illustrating the creation of a task, in accordance with one embodiment.

Each of the embodiments disclosed herein with respect to FIGS. 1-6 may be used in conjunction with a computerized task management system, in various embodiments. One embodiment of a system for managing tasks is shown in FIG. 7A, which is a schematic block diagram illustrating the creation of a task 204 shared over one or more networks. The task 204 may be initiated by a task creator 211. The task creator 211 can be any suitable user 102 within the system. In some cases, for example, the task creator 211 may be a project manager, such as the group leader of the team developing the widget for Company A's final product design. To create the task 204, the task creator 211 can generate a task creation packet 213 that is configured to create the task 204. The task creator 211 can assign various assignments related to the task 204 to one or more task recipients 214. The task creation packet 213 may be sent to a server 215, which in turn can notify N task recipients 214 associated with the task 204 that the task creator 211 has assigned them to the task 204. The N task recipients 214, illustrated as Users 2 through N in FIG. 7A, can then send a response to the server 215 indicating whether or not they will accept their assignment to the task 204. The server 215 can similarly transmit the confirmation of the assignment to the task creator 211. For situations in which a task includes users from different nodes or installations, the methods explained above with respect to FIGS. 5-6 may be used to provide collaboration among all authorized users.

As used herein, the task creator 211 can be a user that initiates the task 204, and the task recipient(s) 214 can be user(s) that are assigned to, or requested to be assigned to, the task 204. Both the task creator 211 and the task recipient(s) 214 can be task participants, because they all may participate in the completion of the task 204. In some cases, however, a task recipient 214 may decline to participate in the task 204 and may therefore not be considered a task participant.

Figure 7B:
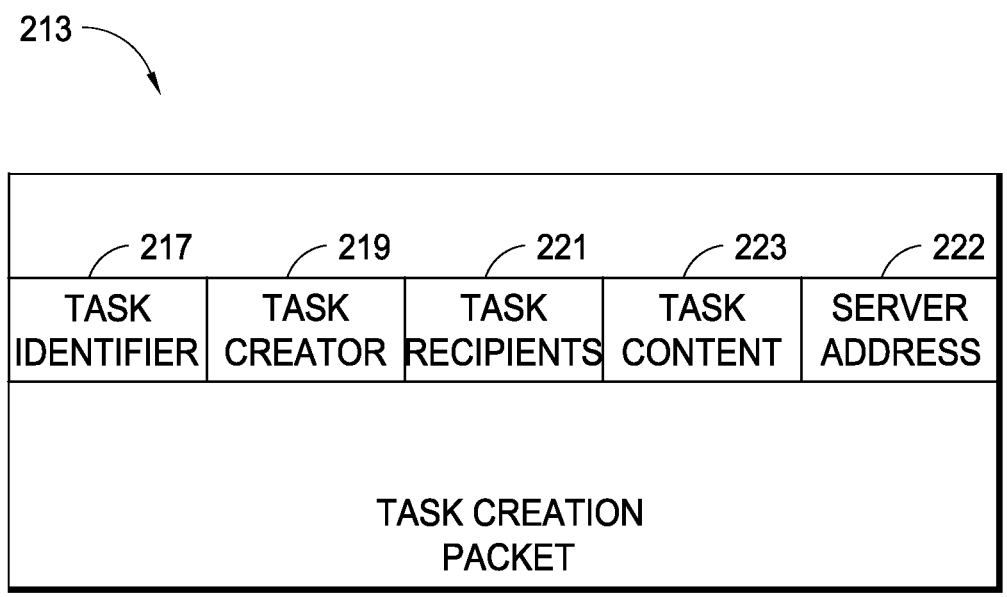
FIG. 7B is a schematic block diagram of a task creation packet, in accordance with one embodiment.

FIG. 7B is a schematic block diagram of an exemplary task creation packet 213, in accordance with one embodiment. The task creation packet 213 can include a task identifier 217 that uniquely identifies the task 204. Because the server 215 may process multiple tasks from multiple users, it can be important to ensure that the tasks 204 are accurately sorted such that each task 204 received by the server 215 is accurately assigned to the correct users and that each task 204 includes the correct information for the task 204. The task creation packet 213 can also include a task creator entry 219 that identifies the task creator 211. For example, the task creator entry 219 can include the name and/or the username of the task creator 211. In some aspects, the task creator entry 219 can include a network or e-mail address of the task creator 211.

The task creation packet 213 can also include a task recipients entry 221 that includes information that identifies one or more recipients 214 of the task. For example, the task recipients entry 221 can include the name and/or username of the task recipients 214. The task recipients entry 221 can also include a network or e-mail address of the task recipients 214. While multiple task recipients 214 are shown in FIG. 7A, it should be appreciated that there may be only one task recipient 214.

The task creation packet 213 can also include task content data 223. The task content data 223 can include details of the task 204, such as the overall goals and objectives of the task 204. The task content data 223 can also include a listing of the task assignments that are assigned to each user associated with the task 204. Further, the task content data 223 can include a task schedule that manages the progression of the task 204. The task content data 223 can also include various accountability measures, such as a schedule of reminder notification that can be sent to the task participants to remind them of their assignments.

The task creation packet 213 can also include a server address field 222. The server address field 222 can include a network ID of the server 215. The network ID may be used at run time to identify whether the user logs in to a specific network or node. In some arrangements, the server 215 can be assigned an e-mail address to which the task creator 211 may send the task creation packet 213. In such instances, the server address field 222 may also include the server's e-mail address.

The task creation packet 213 can be implemented in any suitable format. In one embodiment explained herein, the task creation packet 213 can be implemented in an e-mail message. However, in other embodiments, the task creation packet 213 can be implemented in other formats or using other structures. For example, the task creation packet 213 can be implemented in a website. In other arrangements, the task creation packet 213 can be implemented in a text message (e.g., an SMS message), a voice communication, or a video communication. In such arrangements, the task creator 211 initiates the task 204 by composing an SMS message, a voice communication, or a video communication that outlines the details of the task, the task assignments, and/or the task schedule.

FIG. 7C is a schematic block diagram of an e-mail task creation packet 220, in which the task creation packet 213 of FIG. 7B is implemented in an e-mail message. Using e-mail to implement the task creation packet 213 can be particularly advantageous, in part because e-mail is so ubiquitous. Many or most users have an e-mail address and are comfortable using e-mail. If tasks are instead managed over closed systems, e.g., systems that require special access authorities to participate, then users may be disinclined to use the closed system or it may be difficult for users to learn the closed system. By implementing the task creation packet 213 in an e-mail task creation packet 220, tasks can be efficiently and effectively created and managed by most users without creating additional obstacles to use.

The e-mail task creation packet 220 of FIG. 7C can include the task identifier 217, the task creator entry 219, the task recipients entry 221, and task content data 223 as described above with respect to FIG. 7B. In particular, the task identifier 217 can be implemented in a subject line field of an e-mail message. For example, the task creator 211 can write an e-mail message that includes a subject line specific to the task 204 at hand. For instance, continuing the example of the product design company above, the task creator 211 can create an e-mail message with the subject line reading "Create Widget Prototype." In some arrangements, the text within the subject line can be used as the unique task identifier 217. In other arrangements, however, the server 215 can assign a numeric or alphanumeric identifier associated with the text of the subject line. In some cases, for example, the server 215 can generate additional text to be appended to the subject line of the e-mail that ensures that the task 204 is associated with the correct participants and content data. While the identifier field 217 is shown as corresponding to the "Subject" line of the e-mail message, in other embodiments, the task identifier field 217 can be located with the message field of the e-mail message.

The task creator entry 219 can correspond to the "From" field of the e-mail message. Thus, the task creator 211 can initiate the task 204 by opening a new e-mail message using the task creator's 211 own e-mail account. In the example of FIG. 7A, the task creator 211 is User 1, and the task creator entry 219 reflects that User 1 is the task creator 211. The task recipient's entry 221 can correspond to one or both of "To" and "Carbon Copy," or "CC," fields of the e-mail message. In the example of FIG. 7C, the task recipients 214 can be listed in the e-mail message such that User 2 is listed on the "To" field and Users 3 and 4 are listed on the "CC" field of the e-mail message. When the task creator 211, e.g., User 1, sends the e-mail message that initiates the task 204, Users 2 and 3 will all receive the message. Although the "To" and "CC" fields are illustrated, it should be appreciated that the "Backchannel" or "BCC" field may also be used to send the message to the task recipients 214.

The task content data 223 can correspond to data within the e-mail message field. For example, task objectives and task schedules can be listed in text or image data within the message field of the e-mail. As shown in the example of FIG. 7C, the e-mail message field can include a short note from the task creator 211 that indicates that the assigned task 204 includes scheduling a design meeting, dividing tasks among the participants, and creating a schedule for the finished design. The task recipients 214 may thereby be notified of the general outlines of the task 204 assigned to them. In addition, the server address field 222 can be either the "To" or "CC" fields. As shown in FIG. 7C, the server address field 222 lists "tasks@server.com." When the task creator 211 sends the task creation e-mail, the task creator 211 may list "tasks@server.com," or other e-mail address assigned to the server, in the "To" and/or the "CC" lines of the e-mail. Thus, the server 215 will also receive the e-mail task creation packet 220, which can assist in creating and managing the task 204 on the server 215. As above, the task recipients' email addresses can also be listed in the "BCC" field of the e-mail message.

Thus, the task creation packet 213, which can correspond to an e-mail task creation packet 220, can be sent by e-mail from the task creator 211 to the task recipients 214 and to the server 215. The packet 220 can include task identifying information as well as task content data which can be viewed by the task participants. As explained below in more detail, the server 215 can receive and process the task creation packet 213, and can perform various other task management functions. For example, the server 215 can coordinate scheduling and accountability for performance of the tasks 204 and can also process and analyze data about the users, e.g., the task participants.

Figure 8:
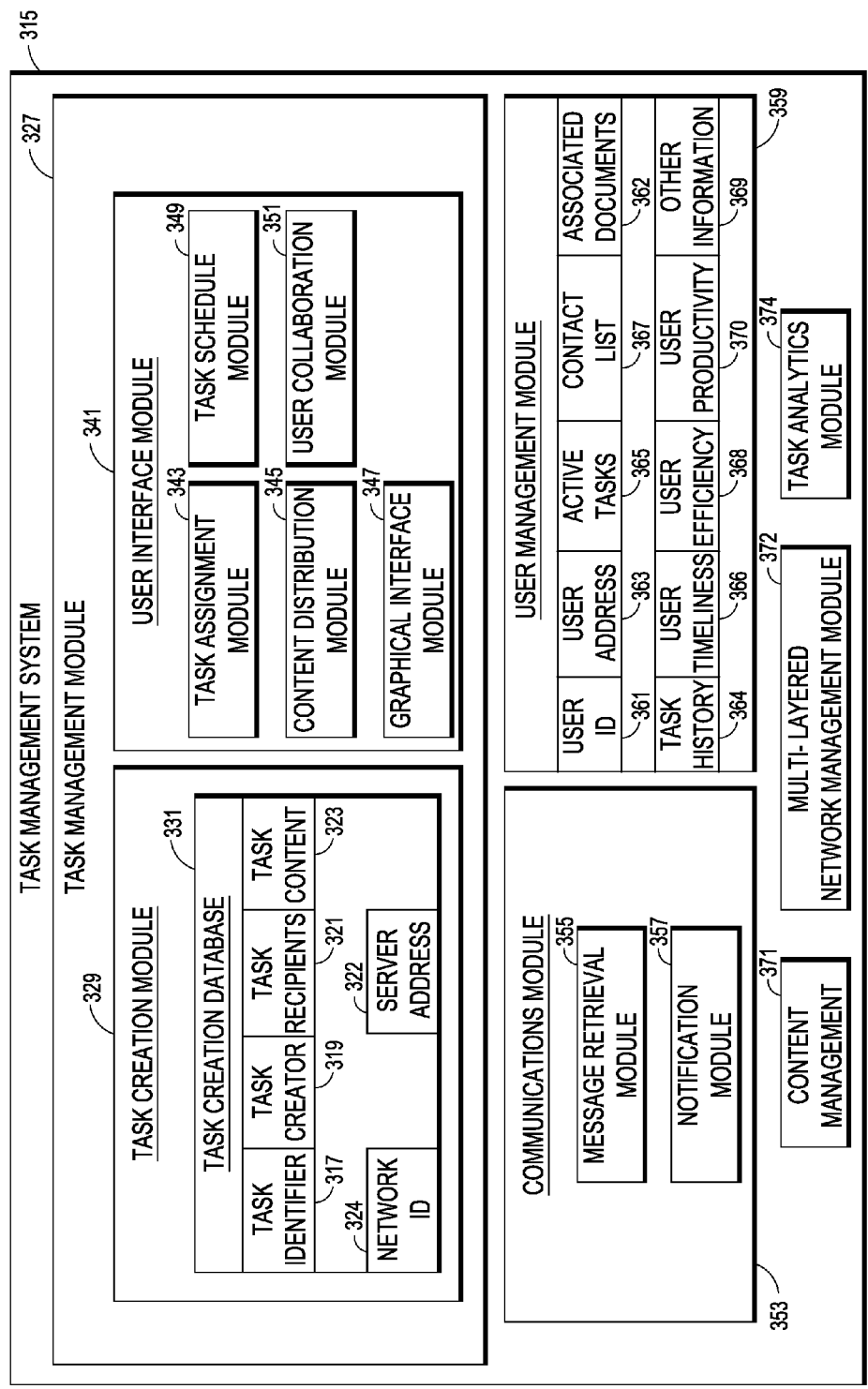
FIG. 8 is a schematic block diagram of a task management system, in accordance with one embodiment.

FIG. 8 is a schematic block diagram of a task management system 315, in accordance with one embodiment. The task management system 315 can include multiple modules that can be implemented and/or stored on a server, such as the server 215 described above. The task management system 315 can include a task management module 327, which can include a task creation module 329, an object management module 346, and a user interface module 341. The task creation module 329 can include a task creation database 331 that processes and stores the task creation packets 213 received from the task creators 211. The task creation database 331 can therefore include data structures that store data received for a plurality of tasks. For example, the task creation database 331 can store an array of the task identifiers 317, task creator entries 319, task recipients entries 321, task content data 323, server addresses 322 that identify the addresses of the servers hosting the tasks, and network IDs 324 that identify to which network a user logs in. For example, a user can create a task within a particular network or node, e.g., Network 1 or Node 1, and the task may thereby be associated with Network 1 or Node 1 by way of the network ID 324. Thus, for each task creation packet 213 that is received by the server 215, the task management system 315 can process and store the information contained in the packet 213 in the task creation database 331. In order to process the information received in the packets 213, the task creation module 329 can further include instructions for identifying and sorting the information in the packets 213.

The object management module 346 can be configured to manage computer objects shared over one or more networks. Examples of such objects include tasks, documents, messages, etc. For example, in some embodiments, the object management module can include instructions to associate each computer object with one or more authorized users and to assign a status to each computer object that indicates the status of that computer object within the system. In various embodiments, the object management module 346 can include instructions to receive a plurality of objects that include object content associated with the object, associate objects with one or more authorized users, assign an object status to each object, process update data for the objects, and update the objects according to the processed update data.

The object management module 346 can also include instructions that provide a central sharing platform for authorized users to monitor the status of objects and to impart accountability upon the authorized users. Further, the object management module 346 can provide a platform for sharing persistent objects with authorized users. For example, when one user modifies a document or replies to a message, the updated object (e.g., the modified document or replied-to message) may automatically present itself to authorized users so that the users have a persistent object with which to work. Similarly, when there are updates to an outstanding task, the object management module 346 can include instructions that update the task objects to reflect the work done and to identify the user that performed the work on the task.

The user interface module 341 can include various modules for processing, sorting, and displaying task information. In some implementations, for example, the task information, e.g., information about the task and task assignments, can be shared among the task participants using the user interface module 341. The user interface module 341 can include a task assignment module 343. The task assignment module 343 can be configured to assign portions or divisions of the task to one or more task participants associated with the task. For example, referring back to the examples of FIG. 7A, User 1 may be the task creator 211, and may assign various tasks to Users 2 and 3, such as, e.g., assigning responsibility for completing various portions of the widget in the final product design. The task creator, or User 1, may also be assigned with a portion of the task.

The user interface module 341 can also include a task scheduling module 349. The task scheduling module 349 can be configured to provide a schedule for performance of the task. For example, the task scheduling module 349 can store information about the overall timeline for completion of the task. Further, the task scheduling module 349 can be configured to notify task participants with reminders about due dates for completing their assigned portions of the tasks. The task scheduling module 349 can also request confirmation of receipt of instructions for participants' assigned portions of the task. By reminding participants about their task obligations, the task scheduling module 349 can thereby increase accountability for participating users and can improve the coordination among task participants.

In addition, the user interface module 341 can include a content distribution module 345. The content distribution module 345 can be configured to share various types of content. For example, the content distribution module 345 can be configured to share a document (such as a text or word processing document), a digital video, a blog entry, or a forum post with one or more tasks participants associated with the task. Task participants can work on common documents, such as common word processing documents, presentation files, or spreadsheets. The task participants can edit the documents and can save the updates to the task management system 315. By providing a central content distribution module 345, documents can be easily edited such that confusion regarding version control and user assignments is minimized.

The user interface module 341 can also include a user collaboration module 351. The user collaboration module 351 can be configured to facilitate communication among the one or more task participants associated with the task. For example, in some arrangements, the user collaboration module 351 can include instant electronic messaging systems to allow task participants to communicate with one another in real-time. In other arrangements, the user collaboration module 351 can include real-time video and/or voice communications modules to enable participants to visually and/or verbally communicate with one another. The task management system 315 can thereby provide a central workspace and task management center that enables multiple task participates to effectively perform their assigned task elements.

The user interface module 341 can comprise a graphical interface module 347 configured to render task information for display on a user device. For example, the various modules of the user interface module 341 can be presented on a website hosted on the World Wide Web. Users can interact with the task management system 315 using various input devices to post content on the task management system 315, including documents, messages to other task participants, and any other data that can be used in the performance of a task. The user interface module 341 can also be programmed to present a task analytics dashboard to a decision-maker, such as a company manager or executive.

Furthermore, the user interface module 341 can include an integrated interface module 348 that may be programmed to incorporate the functionalities of the other modules of the user interface module 341 and that can be programmed to implement a user inbox-outbox interface, such as an interface implemented on a webpage. For example, the integrated interface module 348 may include instructions to provide a graphical user interface that lists the plurality of computer objects and to indicate the assigned status on the graphical user interface to each of the authorized users associated with the computer object. For example, the user inbox-outbox interface can provide an integrated interface to authorized users that presents objects to users in real-time and that includes status updates and due dates for objects. The integrated interface module 348 can therefore be configured to share objects and updates to those objects with other authorized users. For example, the integrated interface module 348 can present various data fields organized and/or managed by the object management module 346. The integrated interface module 348 may render the inbox-outbox interface for presentation to a user.

The task management system 315 can further comprise a communications module 353 configured to provide communication among the task participants. The communications module 353 can comprise a message retrieval module 355 that is configured to receive a message from the task creator. As explained above with respect to FIGS. 7A-7C, the message retrieval module 355 can be configured to receive the message from the task creator in an e-mail message. Further, the message retrieval module 355 can be configured to parse each received message to identify task information (such as task content data) in the message by processing data in one or both of a subject field and a message field of the e-mail message. The message retrieval module 355 can also be configured to identify the task creator and one or more task recipients. For example, the message retrieval module 355 can identify the task creator by processing data in a "From" field of an e-mail message. The message retrieval module 355 can identify task recipients by processing data in one or both of a "To" field and a "CC" field of the e-mail message.

The communications module 353 can also comprise a notification module 357 configured to notify the task participants, e.g., the task creator and/or the task recipients, that the task has been created. The notification module 357 can further be configured to send reminder notices and confirmation notices to the task participants. In various embodiments, the notification module 357 can send such notices to the participants using e-mail.

The task management system 315 can also comprise a user management module 359 configured to process a plurality of tasks (and task initiation messages). The user management module 359 can identify task participant information for the plurality of tasks and can sort the task participant information according to desired sorting criteria. In general, the user management module 359 can gather and sort information about the users that participate in tasks processed by the task management system 315. The user management module 359 can analyze information about the users associated with the tasks in order to identify the users that are most active and/or most valuable to the owner and/or operator of the task management system 315.

For example, in some arrangements, the user management module 359 can analyze task participant information for each task participant or user to determine the number of tasks associated with the task participant or user. Further, the user management module 359 can analyze task participant information for each task participant or user to determine the frequency with which each user or participant interacts with the task management system 315 or participates in a task. By analyzing the number and frequency of interactions with the task management system 315, the user management module 359 can identify the most valuable users associated with the task management system 315. Operators and/or owners of the server can thereby use the information processed by the user management module 359 to identify the most valuable and/or current users of the server. The server operators and/or owners can in turn tailor advertisements, promotions, or other opportunities to the users that are most valuable to the operator and/or owner. As just one example, if User 1 has participated in ten tasks over the past month, while User 2 has participated in only two tasks over the past year, the server operator and/or owner may conclude that User 1 is a more valuable user. The server operator and/or owner may therefore prefer to send User 1 opportunities that arise, because User 1 has demonstrated an active, continuing, fresh commitment to participating in tasks on the server.

In various embodiments, the user management module 359 can monitor the users or participants in the system to determine how effective the users are in meeting task deadlines and expectations. For example, the user management module 359 may monitor the number and/or percentage of tasks in which each user meets or beats the listed deadline, e.g., due date, for a task. The user management module 359 may also monitor the productivity of each user or task participant. For example, the user management module 359 can measure the efficiency of each user, e.g., how long it takes the user to complete a task. In further arrangements, the user management module 359 can measure the productivity of a user based on feedback given by other task participants. For example, if User 1 is viewed as being a team player or an exceptionally talented contributor by User 1's collaborators, then the user management module 359 may determine that User 1 is a valuable user. The user management module 359 can accordingly sort and organize users according to task efficiency and productivity, and can prioritize users (e.g., employees, vendors, customers, etc.), according to their efficiency, quality of work, and/or productivity.

In various embodiments, the user management module 359 can monitor the number of tasks created by or assigned to a particular user. For example, the user management module 359 can track the users that have assigned tasks to a particular task participant and the dates and task identifiers or names that are associated with those assigned tasks. Similarly, user management module 359 can track the users, tasks, and dates of users that have been assigned tasks created by a particular task participant or user. In addition, the user management module 359 may track the number of tasks assigned or created over time, and can monitor whether those tasks are open tasks (e.g., ongoing), closed tasks (e.g., finished), or declined tasks (e.g., the task recipient elected not to participate in the assigned task). In some aspects, the user management module 359 may track the percentage or number of tasks completed over time to track the overall level of progress on one or more tasks or on a project. The user management module 359 can also track the average time to completion for a task or a project. As explained herein with respect to the task analytics module 374, task tracking may also be performed at a company- or organization-wide manner, in which case the total number of tasks or projects may be monitored to determine the number or percentage of tasks that are complete and an average time to complete the tasks or projects.

In addition, the user management module 359 may organize the processed tasks and task participants into one or more user groups. For example, the user management module 359 can recognize when groups of users, e.g., task participants, are affiliated with one another, such as by being employees of the same company or members of the same organization. In various arrangements, the user management module 359 can recognize affiliated users by processing their e-mail addresses. For instance, if two users share the same e-mail domain (e.g., their e-mail addresses are both listed as "@company.com"), then the user management module 359 may organize the two users into the same user group. The user management module 359 can thereby recognize and sort users based on their affiliations with a company or organization.

The user management module 359 may also associate documents, media and other data files with processed tasks and system users. For example, as explained herein, users may work on shared word processing, spreadsheet, presentation, text, or other types of documents or data files when collaborating on a task. The documents may be received from the users and stored on the task management system 315. The user management module 359 may associate the stored documents and media (e.g., video, audio, etc.) with the task participants and the tasks. For example, the user management module 359 can associate a word processing document containing an action item list, a spreadsheet listing cash flow projections, and engineering drawings with a project (e.g., group of tasks) related to a new product design and roll-out. The user management module 359 may also associate the documents or media with the task participants associated with the documents and can display the documents or media on a user interface using the user interface module 341. The task management system 315 may thereby effectively associate the plurality of tasks with the plurality of task participants and any documents or media associated with the task.

Moreover, when one or more tasks are directed to related subject matter, the user management module 359 may group the tasks into a task group. For example, if Cindy works on a task related to testing the reliability of a Widget, then the user management module 359 can store the task information that associates Cindy with the task that relates to the Widget test. If Dan subsequently works on a task relating to testing the same or a similar Widget, even on an unrelated task or project, then the user management module 359 may recognize that Dan's task is related to Cindy's task. For example, the user management module 359 may recognize similar keywords between Dan's and Cindy's tasks, or the user management module 359 may recognize that the subject matter is similar by way of, e.g., subject matter tags. In such arrangements, the user management module 359 may create task groups that include tasks that are directed to related subject matter. Indeed, the user management module 359 may also store tasks in a task history field so that future users may learn from and exploit the experiences of users who have collaborated on similar or related tasks.

In yet other arrangements, tasks may be grouped into one or more projects. A project may be, for example, a complex or long-term endeavor that includes multiple tasks that may or may not be directed to related subject matter. For example, if a project's objective is to roll out a new product design, then a company may assign disparate tasks to its multiple divisions. Executives may assign product development to the engineering department, product sales to its sales or marketing department, and product manufacturing to its manufacturing arm or to a third-party contractor. The user management module 359 can recognize that each task in a project, although potentially relating to different subject matter, is related to achieving the overall objectives of the project.

Further, the user management module 359 can monitor projects to determine the degree of completion of the projects by, e.g., monitoring the status of the task(s) that make up the projects. If, for example, a project includes five tasks, and if two tasks are completed while three remain uncompleted, then the user management module 359 may determine that the project is about 40% complete. In further arrangements, the user management module 359 can determine the overall degree of completion of the project by accounting for even partially completed tasks. For example, if there are five tasks in the projects, and if two tasks are each 25% completed and the other three tasks are each 50% completed, then the overall project status may be computed. In this example, therefore, the overall project completion may be determined by a linear combination of the partially completed tasks. For example, the two tasks (out of five total) that are only 25% completed yield a project completion status of (2/5)*25%=10%. The other three tasks that are each 50% completed contribute to a completion status of (3/5)*50%=30%. Thus, the total degree of completion of the project will be about 10%+30%, for a total degree of completion of about 40%. In sum, the user management module 359 can estimate the degree of completion of a project that includes one or more tasks.

In addition, each task participant or user can be associated with multiple other users over the course of participating in numerous tasks with the other users. Thus, each user can have or be associated with a contact list. The contact list can include a list of one or more contacts that have participated in at least one task with the task participant. Thus, each user and/or task participant can form a network of related contacts that have participated in task(s) on the task management system 315. For example, the task management system 315 can sort the contact list based at least in part on the frequency with which the contact(s) have participated in tasks with the task participant. Fresh and valuable relationships can therefore be prioritized. In some instances, for example, weights can be assigned to contacts on each user's contact list based on the value of each contact on the contact list. For instance, contact weights can be assigned to contacts based on the frequency with which the contact(s) have participated in tasks with the task participant. Thus, a first contact may be assigned a first contact weight, and a second contact may be assigned a second contact weight. If the first contact has more frequent and/or more recent interaction with the task management system 315 and participation in tasks than the second contact, then the first contact weight may be assigned a greater value than the second contact weight. The task management system 315 can thereby prioritize user contacts on the contact list based on the value of the user contacts and the underlying value of the contacts.

By monitoring tasks, task due dates, task participants, and interactions among task participants, the user management module 359 can provide valuable information to a company or organization. For example, the user management module 359 can inform executives and/or decision-makers about upcoming due dates or milestones of projects and/or tasks. By providing a company-wide schedule, the user management system 359 can give companies a high-level picture of the work that is being performed by its employees. The company can use these metrics to prioritize tasks or to make new investments. By monitoring user productivity, efficiency, and responsibility, companies can recognize valuable employees, vendors, and customers, and can prioritize its relationships accordingly. Further, by organizing documents associated with the tasks and task participants, the company or organization can easily and efficiently access the content associated with the tasks and/or projects at issue.

As shown in FIG. 8, the user management module 359 can include a database with a plurality of fields that can store information about the users and/or task participants. For instance, the user management module 359 can include a database with a user ID field 361 that includes the name and/or username of each user that has participated in a task over the task management system 315. Further, the database can have a user address field 363 that lists an e-mail or network ID of the user. An active tasks field 365 can include a list of all the tasks in which the user is currently participating. A contact list field 367 can store the contact list associated with each user. As explained above, the contact list can include a list of all users with which the user has participated in a task. Further, an associated documents field 362 can list documents that are associated with the user and/or the tasks associated with the user. Similarly, a task history field 364 can store the subject matter and/or keywords associated with tasks on which the user has collaborated in the past. Other users or organizations can exploit the task history field 364 to leverage users' prior experiences with a particular task or project. For example, a search engine can be provided to search for keywords and/or subject matter of prior tasks and/or task participants. A user timeliness field 366 and a user efficiency field 368 can be provided to monitor whether or not a user timely meets expected due dates and how fast a user completes various tasks. The company or organization can thereby compare users' efficiencies and reliability when making decisions. A user productivity field 370 may also be included to measure how productive a user is at a series of tasks or projects. For example, user productivity may be measured based upon feedback and/or surveys completed by other task participants, or even by third parties. A miscellaneous, other information field 369 can store additional information or notes about each user. For example, if the owner and/or operator of the server has additional information or a history with a particular user, then the owner and/or operator of the server can input this information into the other information field 369.

Thus, by gathering and sorting information about users that have participated in tasks on the server, the owner and/or operator of the server can utilize user information to optimize system performance or to otherwise benefit the owner and/or operator of the server. For example, relationships with active and/or valuable contacts can be prioritized over relationships with stale or otherwise inactive or less valuable contacts. The task management system 315 can also include a multi-layered network management module 372. As explained in more detail below, the multi-layered network management module 372 may advantageously manage the interrelationships among multiple individual networks and global networks. Further, the task management system 315 can include a task analytics module 374 configured to analyze the relationships between multiple task participants, projects, and task documents.

The task management system 315 can also include content management 371 that can store data associated with the functions performed by the task management system 315. For example, the content management 371 can include memory configured to permanently store instructions encoded as software that is configured to perform the functions on the task management system 315, as described herein. Further the content management 371 can store data received and processed by the task management system 315, including, e.g., task content information and user information.

All of the features described above may be embodied in, and automated by, software modules executed processors or integrated circuits of general purpose computers. The software modules may be stored in any type of computer storage device or medium. All combinations of the various embodiments and features described herein fall within the scope of the present invention.

Although the various inventive features and services have been described in terms of certain preferred embodiments, other embodiments that are apparent to those of ordinary skill in the art, including embodiments which do not provide all of the benefits and features set forth herein and do not address all of the problems set forth herein, are also within the scope of this invention. The scope of the present invention is defined only by reference to the appended claims.

What is claimed is:

1. A computer-implemented method for sharing tasks over one or more computer networks, the method comprising:
providing a task created on a first computer system located in a first node, the task comprising content information and metadata information;
sharing the task with a user of a second node that is different from the first node by creating an entry in an object mapping table of a global datastore, the entry associating a task identifier with the first node;
transmitting the metadata information of the task to a second computer system in the second node over the one or more computer networks without transmitting the content information, the metadata information comprising at least the task identifier;
receiving a request from the user to access the task;
verifying that the user is a task participant; and
securely presenting the content information of the task to the user over the one or more computer networks.

2. The method of claim 1, wherein the metadata information comprises identifying information related to the task, and wherein the content information comprises data related to the substantive content of the task.

3. The method of claim 1, wherein providing the task comprises creating and storing the task on the first computer system.

4. The method of claim 1, further comprising encrypting at least the content information of the task.

5. The method of claim 1, wherein the metadata information further comprises at least one of a task creator and a task name.

6. The method of claim 1, wherein the content information comprises at least one of a task objective and a status of the task.

7. The method of claim 1, wherein the first node and the second node are located in different countries.

8. A computer-implemented method for sharing computer objects over one or more computer networks, the method comprising:
providing a computer object on a first computer system located in a first node, the computer object comprising content information and metadata information;
creating a sharing relationship for the computer object with a user of a second node that is different from the first node by creating an entry in an object mapping table of a global datastore, the entry associating an identifier of the object with the first node;
transmitting the metadata information of the computer object to a second computer system in the second node over the one or more computer networks without transmitting the content information;
receiving a request from the user over the one or more computer networks to access the computer object;
verifying that the user has permission to access the computer object; and
securely presenting the content information of the computer object to the user over the one or more computer networks.

9. The method of claim 8, further comprising creating the computer object in response to a request from a first user of the first network.

10. The method of claim 8, further comprising encrypting at least the content information of the computer object.

11. The method of claim 8, wherein verifying that the user has permission comprises verifying an access token provided by the user.

12. The method of claim 8, wherein the computer object comprises at least one of a task, a document, a file, a message, a user, a user group, and an internet post.

13. The method of claim 12, wherein the computer object comprises a task.

14. The method of claim 13, wherein the metadata information of the task comprises at least one of a task identifier, a task creator, and a task name.

15. The method of claim 13, wherein the content information of the task comprises at least one of a task objective and a status of the task.

16. The method of claim 8, wherein the first computer node and the second computer node are located in different countries.

17. The method of claim 8, wherein the first computer system and the second computer system are located in different countries.

18. A system for sharing computer objects over one or more computer networks, the system comprising:
a processing module configured to:
provide a computer object on a first computer system located in a first node, the computer object comprising content information and metadata information, wherein the metadata information comprises identifying information related to the computer object, and wherein the content information comprises data related to the substantive content of the computer object;

create a sharing relationship for the computer object with a user of a second node that is different from the first node; and verify that the user has permission to access the computer object; and a communications module configured to:

transmit the metadata information of the computer object to a second computer system in the second node over the one or more computer networks without transmitting the content information;

receive a request from the user over the one or more computer networks to access the computer object; and securely present the content information of the computer object to the user over the one or more computer networks.

19. The system of claim 18, further comprising a storage module, the storage module comprising non-transitory computer-readable media to store the computer object.

20. The system of claim 18, wherein the computer object comprises at least one of a task, a document, a file, a message, a user, a user group, and an internet post.

21. The system of claim 20, wherein the computer object comprises a task.

22. The system of claim 21, wherein the metadata information of the task comprises at least one of a task identifier, a task creator, and a task name.

23. The system of claim 21, wherein the content information of the task comprises at least one of a task objective and a status of the task.

24. The system of claim 18, wherein the system comprises the first computer system.

25. The system of claim 18, wherein the first computer system and the second computer system are located in different countries.

26. A computer-implemented method for sharing computer objects over one or more computer networks, the method comprising:

providing a computer object on a first computer system located in a first node, the computer object comprising content information and metadata information;

creating a sharing relationship for the computer object with a user of a second node that is different from the first node;

transmitting the metadata information of the computer object to a second computer system in the second node over the one or more computer networks without transmitting the content information, wherein the metadata information comprises identifying information related to the computer object, and wherein the content information comprises data related to the substantive content of the computer object;

receiving a request from the user over the one or more computer networks to access the computer object;

verifying that the user has permission to access the computer object; and securely presenting the content information of the computer object to the user over the one or more computer networks.

27. The method of claim 26, wherein creating the sharing relationship comprises creating an entry in an object mapping table of a global datastore, the entry associating an identifier of the object with the first node.

* * * * *